March 13, 1956  A. DANZIGER  2,738,443
ELECTRONIC FLASH APPARATUS FOR PHOTOGRAPHY
Filed Dec. 19, 1952
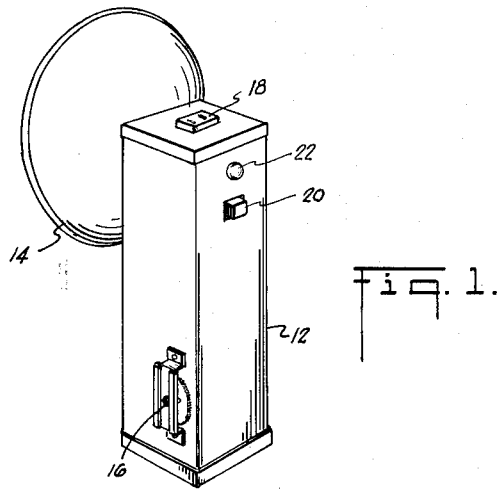
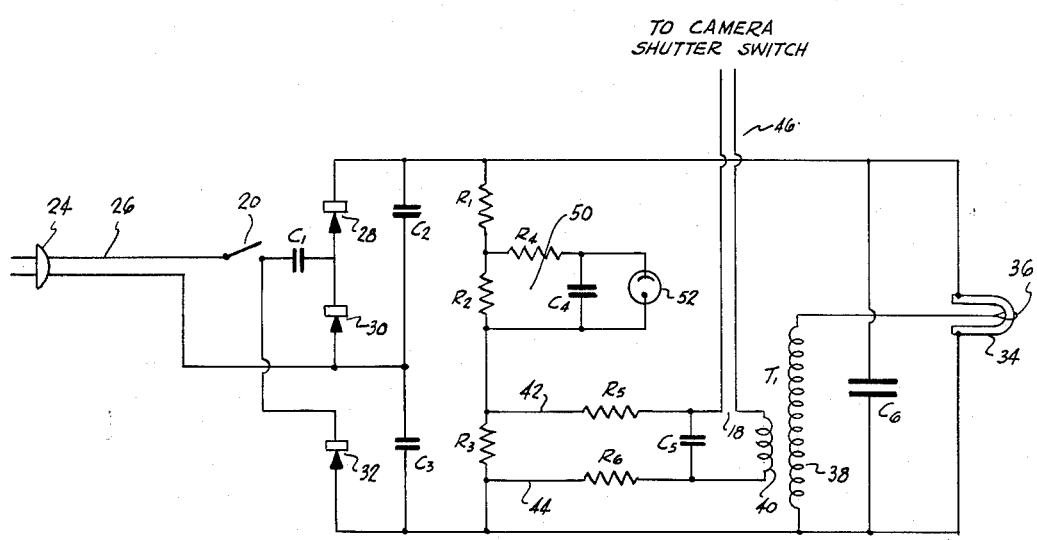
INVENTOR.
ALBERT DANZIGER
BY
ATTORNEYS United States Patent Office 2,738,443
Patented Mar. 13, 1956

2,738,443

ELECTRONIC FLASH APPARATUS FOR PHOTOGRAPHY

Albert Danziger, Brooklyn, N. Y.

Application December 19, 1952, Serial No. 326,853

4 Claims. (Cl. 315—205)

This invention relates to photography, and more particularly to electronic flash apparatus.

In earlier practice flash bulbs were used, fired by a few low-voltage flashlight-type battery cells. A synchronizing switch is commonly built into the shutter, and is usually a low-voltage switch one side of which is connected to the metal parts of the camera. This was of no consequence when using only a few volts to fire a discardable flash bulb.

To do away with the breakage and explosion hazard as well as the trouble and expense of handling successive individual flash bulbs, there has been developed more recently an electronic flash apparatus using a single gas filled tube which may be fired repeatedly. The energizing and control circuit is commonly connected to an ordinary 110 volt A. C. power line outlet (although power packs using a battery, vibrator, and transformer are available for a portable supply). Such electronic flash units have grown in popularity, but difficulty has arisen on occasion because of a shock received by the photographer while holding the metal parts of the camera and flash apparatus. This has caused considerable distress, even disregarding possible injury to the photographer, because of hastily dropping and consequent injury to the equipment. In addition there is the possibility of actual physical harm under favorable grounding conditions, as when the photographer is backed up against a metal radiator, or is standing on a wet surface, or is touching plumbing which in turn is connected to the A. C. supply line.

Efforts have already been made to cure this difficulty, and for that purpose some apparatus is provided with a relay of the electro-mechanical type, connected between the camera shutter switch and the flash circuit. In other cases an electron tube or a gas relay has been used instead of an electro-mechanical relay. In either case the thought is to isolate the metal parts of the camera, and consequently the photographer, from direct electrical connection to the circuit. However, relays have not proved wholly desirable, and add to the bulk and cost of the apparatus.

The primary object of the present invention is to overcome the foregoing difficulties, and to provide a shock-proof electronic flash circuit which is simple and safe and which adds only negligibly to the cost and bulk of the apparatus.

To accomplish the foregoing general objects, and other more specific objects which will hereinafter appear, my invention resides in the electronic flash circuit elements, and their relation one to another, as are hereinafter more particularly described in the following specification. The specification is accompanied by a drawing, in which:

Fig. 1 is a perspective view showing the physical exterior of one form of electronic flash unit embodying my invention; and Fig. 2 is a wiring diagram for the shock-proof circuit.

Referring to the drawing, and more particularly to Fig. 1, the electronic flash unit comprises a housing 12 carrying a reflector 14 which surrounds a gas discharge tube located at the appropriate point optically. A conventional threaded stud at 16 may be used to connect the unit to certain cameras directly, or to an upright arm of an L-shaped bar used with other cameras. The horizontal arm of such a bar underlies the camera and is secured thereto by a similar threaded stud. A relatively long flexible cord for connection to an ordinary 110 volt A. C. power line outlet is provided, but is not shown in the drawing.

A socket 18 at the top of the unit receives the plug of a short synchronization cord, the other end of which has a suitable connection for the camera shutter switch. A switch lever 20 at the back of the unit may be used to energize or de-energize the entire circuit preparatory to taking a picture. If desired the circuit may include an indicator to show when the circuit is ready to flash, and in the present case the glass lens of such an indicator is shown at 22 above the switch 20.

Referring now to the wiring diagram in Fig. 2 of the drawing, power is supplied from an ordinary A. C. outlet through a conventional male plug 24 and a flexible supply cord 26. The switch 20 is the manually operable on-and-off switch previously referred to in connection with Fig. 1. This controls the supply of power to a voltage multiplier, which in this case is a voltage tripler comprising the three condensers C1, C2, and C3, and the three rectifiers 28, 30 and 32. The output of the voltage tripler is connected to a main storage capacitor C6, which in turn is connected to a gas discharge flash tube 34. Thus the tube is supplied with a peak voltage of about 450 volts, but this is insufficient to flash the lamp 34 unless the gas content is preliminarily ionized with the aid of a trigger voltage applied to a trigger electrode, schematically indicated at 36.

A relatively high triggering voltage is obtained from the secondary 38 of a high ratio step-up transformer T1. This has a primary 40 which is separate and insulated from the secondary 38. In many prior circuits an autotransformer connection has been used, but it is significant in my circuit to use a two-winding transformer. The primary 40 has a trigger storage condenser C5 connected in shunt therewith, and the latter in turn is supplied with a part of the voltage across the voltage tripler. More specifically, there is a voltage divider having three resistors R1, R2 and R3 connected in series with one another and across the voltage multiplier. The supply leads 42 and 44 to the trigger circuit are connected across the resistor R3.

The socket which receives the synchronizing cord is located at 18, that is, between the transformer primary 40 and the trigger storage condenser C5. Thus the flexible cord leading to the camera shutter switch is located at 46, and when the shutter switch is closed, permits a surge of current to discharge from trigger storage condenser C5 through primary 40. The transformer step-up ratio is preferably high, in this case 188 turns to 10,000 turns. The voltage step-up is not strictly in proportion, because we do not deal here with a sine wave, and instead have a steep-sided single wave front.

As a refinement, the apparatus may be provided with a "flash-ready" indicator. Such indicators are already known, and in the present case the indicator comprises a relaxation circuit 50 made up of a resistor R4 and condenser C4 connected to a small neon lamp 52. This circuit is connected across another part of the voltage divider, in this case across the resistor R2.

It will be understood that when the manual switch 20 is closed the storage condensers C5 and C6 store up, and when the stored potential is adequate the lamp 52 lights, thus indicating to the photographer that he may operate the shutter. When he operates the shutter, the camera shutter switch causes triggering of the gas tube in synchronism with the operation of the shutter. After a short delay the condensers again store up enough to again light the "flash-ready" lamp 52.

As so far described the electronic flash circuit is largely conventional, except that it is common practice to use an auto-transformer instead of a two-winding transformer at T1. In accordance with my invention I also employ a very high impedance in each of the two supply lines 42 and 44. These impedances are indicated at R5 and R6. Resistors are simple and inexpensive to use. They may be in the range of from, say, 3 to 10 megohms. Such resistors will permit charging of the trigger condenser C5, but they will not permit a flow of sufficient current to shock or injure the photographer. Thus, although the camera shutter switch may have one side connected to the metallic parts of the camera, and although the photographer may hold these metal parts directly in his hands, he is nevertheless isolated from the voltage multiplier and the A. C. supply line, because on one side there are interposed the very high impedances R5 and R6, and on the other side the transformer primary 40 is insulated from the secondary and the main circuit to the A. C. supply line.

The increase in cost of the present circuit is negligible. Transformers are most frequently made with four leads coming out of the transformer, and two of these were connected together when using the transformer as an auto-transformer. In my circuit the four leads are used separately. The resistors R5 and R6 are small in size and cost, and ordinarily would require no increase in the manufacturer's selling price for the completed apparatus.

By way of example, and not intended in any way as a limitation of the invention, I may state that in a particular circuit embodying my invention the following component values are employed:

| | |
|---|---|
| C1 | 2 mfd. @ 150 volts |
| C2 | 2 mfd. @ 350 volts |
| C3 | 2 mfd. @ 150 volts |
| C4 | .1 mfd. @ 150 volts |
| C5 | .2 mfd. @ 150 volts |
| C6 | 525 mfd. @ 450 volts |
| R1 | 2.0 megohms |
| R2 | 1.2 megohms |
| R3 | 1.2 megohms |
| R4 | 2.2 megohms |
| R5 | From 3 to 10 megohms |
| R6 | From 3 to 10 megohms |

The transformer T1 is an ionizing transformer having a secondary voltage of approximately 15,000 volts peak when the trigger condenser C5 is discharged through the primary. The turns ratio is 188 to 10,000. The secondary preferably has a spiral turn winding at both ends and also at the center of the secondary.

The flash tube used in the particular circuit shown is an FT-105 tube made by the General Electric Company of Schenectady, N. Y. It employs a U-shaped glass envelope with a trigger electrode outside the envelope at the center. However, it will be understood that other gas discharge tubes, some of which are straight and some of which are helical, may also be used.

When the trigger voltage ionizes the gas in the tube the stored up energy in condenser C6 discharges through the tube, providing a single high-intensity flash. The light could not be sustained even if the camera shutter switch were kept closed, but in practice the camera shutter switch is only momentarily closed, and after the flash the condensers again begin to store up energy in preparation for the taking of another picture. The duration of the flash is independent of the closed period at the contacts of the camera shutter switch. Instead the flash duration is a function of the circuit constants and the lamp, and in different circuits may vary from, say, 1/500 to 1/10,000 of a second. In the present apparatus, using the components described above, the flash duration is about 1/500 of a second. It requires only a matter of seconds, say five seconds or at most ten seconds in some cases, to charge the storage condensers sufficient for the taking of another picture.

It will be seen from the foregoing description that the present improvement centers mainly about the provision of two very high impedances, preferably resistors, connected between the voltage divider and the trigger condenser, combined with the use of a two-winding trigger transformer, thereby isolating the camera shutter switch, except for the connection through the high resistors. These resistors are high enough so that even if the operator were to ground himself to the grounded side of the A. C. line, no more than a trickle of current, say a few microamperes, could flow. Nevertheless, this current is sufficient to charge the trigger condenser in about the same time as it takes to charge the main condenser, and when the ready-indicator lamp flashes, the circuit is ready at both condensers.

It is believed that the method of making and using my improved electronic flash apparatus, as well as the advantages thereof, will be apparent from the foregoing detailed description. It will also be apparent that while I have shown and described my apparatus in a preferred form, changes may be made within the scope of the invention, as sought to be defined in the following claims.

I claim:

1. The combination with a photographic flash circuit comprising a main storage capacitor, and a flash tube connected across said storage capacitor and having a trigger electrode, of a trigger transformer having its secondary connected to the trigger electrode and having its primary isolated from the secondary by a high impedance, a supply circuit for the primary, said primary circuit having a trigger storage condenser connected across the circuit in shunt with the primary, a high impedance in each side of the supply circuit leading to said trigger condenser, said impedances being of the order of megohms, said high impedances serving as the means to isolate the primary of the transformer from the secondary, and a socket for a conventional synchronization cord leading to a camera shutter switch, said socket being connected in the supply circuit between the trigger condenser and the transformer primary.

2. The combination with a photographic flash circuit comprising a voltage multiplier, a main storage capacitor, and a flash tube connected across said storage capacitor and having a trigger electrode, of a high step-up ratio trigger transformer having its secondary connected to the trigger electrode and having its primary isolated from the secondary by a high impedance, a supply circuit for the primary receiving a part of the voltage across the voltage multiplier, said primary circuit having a trigger storage condenser connected across the circuit in shunt with the primary, a high impedance in each side of the supply circuit leading to said trigger condenser, said impedances being of the order of megohms, said high impedances serving as the means to isolate the primary of the transformer from the secondary, and a socket for a conventional synchronization cord leading to a camera shutter switch, said socket being connected in the supply circuit between the trigger condenser and the transformer primary, whereby the metal parts of the camera are effectively isolated from the voltage multiplier and its power supply line.

3. The combination with a photographic flash circuit comprising a voltage multiplier using rectifiers and condensers, a main storage capacitor, and a flash tube connected across said storage capacitor and having a trigger electrode, of a high step-up ratio trigger transformer having its secondary connected to the trigger electrode and having its primary isolated from the secondary by a high impedance, a supply circuit for the primary receiving a part of the voltage across the voltage multiplier, said primary circuit having a trigger storage condenser connected across the circuit in shunt with the primary, means to connect the camera shutter switch between said condenser and said primary, and a high impedance of the order of megohms in each side of the supply circuit leading to said trigger condenser, said high impedances serving as the means to isolate the primary of the transformer from the secondary.

4. A photographic flash circuit comprising a voltage multiplier using rectifiers and condensers, a main storage capacitor, a flash tube connected across said storage capacitor and having a trigger electrode, a high step-up ratio trigger transformer having its secondary connected to the trigger electrode and having its primary isolated from the secondary by a high impedance, a supply circuit for the primary receiving energy from the voltage multiplier, said primary circuit having a trigger storage condenser connected across the circuit in shunt with the transformer primary, means to connect the camera shutter switch between said condenser and said primary, and a very high impedance in each side of the supply circuit leading to said trigger condenser, said impedances being of the order of megohms, said high impedances serving as the means to isolate the primary of the transformer from the secondary.

References Cited in the file of this patent

UNITED STATES PATENTS

| | | |
|---|---|---|
| 2,025,471 | Osborne | Dec. 24, 1935 |
| 2,072,278 | Schade | Mar. 2, 1937 |
| 2,393,316 | Edgerton | Jan. 22, 1946 |
| 2,395,600 | Weisglass | Feb. 26, 1946 |
| 2,516,209 | Henninger | July 25, 1950 |
| 2,517,031 | Rochester | Aug. 1, 1950 |
| 2,538,577 | McCarty | July 16, 1951 |
| 2,589,720 | McMath | Mar. 18, 1952 |
| 2,628,331 | Rockafellow | Feb. 10, 1953 |